United States Patent
Craig

(10) Patent No.: US 7,317,915 B2
(45) Date of Patent: Jan. 8, 2008

(54) METHOD AND APPARATUS FOR TESTING A RADIO NETWORK

(75) Inventor: Stephen Craig, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 10/888,519

(22) Filed: Jul. 12, 2004

(65) Prior Publication Data

US 2006/0009160 A1    Jan. 12, 2006

(51) Int. Cl.
*H04Q 7/20* (2006.01)

(52) U.S. Cl. .............. 455/423; 379/112.01; 379/112.1; 379/133; 379/134; 379/32.01; 340/230; 340/252

(58) Field of Classification Search .............. 455/423, 455/424, 446, 447, 448, 449, 429, 453; 370/230, 370/252
See application file for complete search history.

(56) References Cited

U.S. PATENT DOCUMENTS

| | | | | |
|---|---|---|---|---|
| 5,570,373 A | * | 10/1996 | Wing | ......................... 455/423 |
| 5,859,838 A | * | 1/1999 | Soliman | ..................... 370/249 |
| 5,987,306 A | | 11/1999 | Nilsen et al. | |
| 6,144,852 A | * | 11/2000 | Orosz | .......................... 455/423 |
| 6,192,249 B1 | * | 2/2001 | Padovani | ..................... 455/453 |
| 6,336,035 B1 | * | 1/2002 | Somoza et al. | ............. 455/446 |
| 6,640,101 B1 | * | 10/2003 | Daniel | ........................ 455/423 |
| 6,662,008 B1 | * | 12/2003 | Dolan et al. | ................. 455/423 |
| 6,868,075 B1 | * | 3/2005 | Narvinger et al. | .......... 370/335 |
| 6,873,601 B1 | * | 3/2005 | Chow et al. | ................. 370/254 |
| 2003/0092382 A1 | * | 5/2003 | Vayanos et al. | ........... 455/13.4 |
| 2005/0094561 A1 | * | 5/2005 | Raaf | .......................... 370/235 |

* cited by examiner

*Primary Examiner*—Rafael Perez-Gutierrez
*Assistant Examiner*—Nimesh Patel
(74) *Attorney, Agent, or Firm*—Nixon & Vanderhye P.C.

(57) ABSTRACT

In a radio communication system that includes multiple service areas, each service area is associated with a predetermined number or amount of radio communication resources. Each radio communication resource can be used for a prescribed period of time corresponding to one or more time units. An operator or other entity identifies a set of service areas to be tested at an increased effective load. A desired test level (e.g., increased traffic load) is determined, and a corresponding number of radio resource time units is determined to achieve the desired test level conditions. Use of radio communication resources in the determined one or more time units is blocked for a test period. Performance by each service area during the test period is determined.

34 Claims, 4 Drawing Sheets

METHOD AND APPARATUS FOR TESTING A RADIO NETWORK

FIELD OF THE INVENTION

The invention relates to a system for testing cellular radio communication networks, and in particular, the performance of such networks under increased load.

BACKGROUND AND SUMMARY

The rapid, world-wide expansion of cellular networks and the introduction of new wireless services combined with competition among network operators has meant an ever-increasing need for continuous improvement as to quality, capacity, and accessibility. From the network operator perspective, higher quality, increased capacity, and better accessibility must be provided while also keeping the cost of calls and other services as low as possible. Moreover, to allow for future traffic growth and the introduction of new services, major investments in network equipment and functionality are typically necessary. This new equipment and functionality must be verified in realistic circumstances before being deployed commercially. Even with equipment and functionality already in place, it is important that operators can obtain a "proof of performance" with the possibility to identify and remedy problem areas before the higher loads and/or new services exist in commercial operation.

Consequently, operators are particularly interested in obtaining information regarding the likely performance of a particular network under increased load conditions in which a greater percentage of the available radio resources is being used. For example, a network operator may want proof or demonstration regarding whether and how well an existing site configuration can provide additional service(s). But accurately providing this kind of information is difficult, particularly if there are insufficient users available to load those sites to the increased level desired and/or there is insufficient hardware currently installed at the sites to support the higher traffic load.

To test the capacity of a particular network or site configuration that includes a plurality of sites and/or sectors, the traffic could be increased by simply increasing the number of people making calls in the test area, assuming that there is sufficient installed equipment to handle the higher load. But this kind of manual loading process is time-consuming and expensive and requires that a large number of people be employed and sent out to load up the network with calls. Another problem with the manual loading approach is that it is difficult to ensure that these newly-added test users mimic the behavior of real traffic loading since they are being asked to make "artificial" test calls. Their mobility patterns and cellular phone usage may significantly differ from those of real users, thereby raising doubts about the accuracy of the system performance results so obtained.

An alternative approach to increase the effective load on the network test area would be to increase the radio resource burden of each existing user, for example, by disabling power control and/or discontinuous transmission (DTX). Since features such as power control and DTX reduce the power transmitted by each user, disabling them is equivalent to adding more users manually in terms of the traffic load level in the network. An advantage with this method over the manual loading technique is that the drawbacks regarding time, cost, organization, and accuracy of results outlined above are avoided. A disadvantage, however, is that the gain from features like power control and DTX is typically difficult to quantify in practical situations, and therefore, the effective load on the network achieved by disabling these features is uncertain.

A better loading approach to increase the effective load on the network test area is to reduce the number of available radio resources. Traffic load is typically distributed onto a limited amount or number of radio resources. For example, in the context of a radio communications network that employs time division multiple access (TDMA) technology, the radio resources include time slots and frequencies. If the same number of users may only utilize a reduced quantity of radio resources, then the load on these radio resources is increased. If the radio resources in the system, e.g., time slots and frequencies in a TDMA system, are equivalent and independent, then the performance results obtained using the reduced, sub-set of radio resources can be extrapolated to give network performance measures for the full network resource situation at higher loads.

A difficulty with reducing the amount or number of available radio resources in order to increase the effective load is that not all radio resources are equivalent and independent, which makes extrapolation of the test results uncertain. For example, frequency bandwidth is typically an important radio resource. But because multi-path fading is frequency-dependent, reducing the frequency bandwidth influences the ability of users to combat multi-path fading, which adversely affects performance. Hence, obtaining test results with a reduced frequency bandwidth suffers from the same uncertainties in extrapolation to overall network performance as those discussed above in the context of increasing the radio resource burden of each user, for example, by disabling power control and/or DTX.

In the GSM TDMA system, users typically utilize frequency bandwidth by frequency hopping over multiple frequencies, each having 200 kHz bandwidth. In a system that implements frequency hopping, like GSM, reducing the number of available radio resources might correspond to reducing the number of hopping frequencies. The result is that existing calls must be handled using the reduced number of frequencies, which increases the load on those remaining frequencies. A drawback with reducing the number of frequencies, particularly in a frequency hopping context, is that it adversely affects the ability to combat multi-path fading by reducing the frequency bandwidth used by a connection, as explained above. It also reduces the variation of radio quality within a radio block, which reduces decoding performance when significant channel coding is present, as is the case with GSM speech. Further, it reduces the interference averaging effect that allows the gains of some users, e.g. due to DTX, to benefit all users. Hence, increasing the effective load in a GSM network for test purposes by reducing the number of hopping frequencies has significant disadvantages because the radio environment experienced by the users is fundamentally altered in the process.

In a frequency hopping GSM system, the effective load on the radio resources can be measured by the frequency load, which is defined as the served traffic (the number of users and their bandwidth requirements), divided by the number of hopping frequencies times the number of time slots. Since increasing the traffic via artificially adding more "test" users, via increasing the radio resource burden of the existing users, or via reducing the number of hopping frequencies all have disadvantages, a better way of increasing the load in a GSM system is to reduce the number of time slots in each frequency or frequency hopping channel group, for example, by blocking a predetermined number of time slots to traffic. Individual time slots are independent of the other time slots, and the radio environment experienced by the users is unaffected since the correct number of hopping frequencies is still used. By carefully selecting the number of time slots to be used, the frequency load can be increased without resulting in congestion to existing users. This is achieved by either ensuring that sufficient equipment is in place to prevent congestion in the frequency hopping channel group with the reduced number of time slots, or by creating an extra frequency or frequency hopping channel group with a full set of time slots that can serve users that would otherwise be denied access to the network. In GSM, such an extra frequency channel group may typically contain a non-frequency hopping, broadcast control channel (BCCH) frequency.

This approach to increasing the effective load may be used in cellular networks that do not employ TDMA and/or frequency hopping. For example, the invention can be applied to orthogonal frequency division multiplexing (OFDM) and related access techniques by limiting the time of use for one or more sub-channel frequencies, as well as to spread spectrum, code division multiple access (CDMA) based systems. In all radio resource access techniques, time is a common radio resource. If desired, the approach can also be combined with other mechanisms/techniques for increasing effective system load, such as (but not limited to) those outlined above.

The reduced time slot approach may be used in a radio communication system that includes multiple service areas. Each service area is associated with a predetermined number or amount of radio communication resources. Each radio communication resource can be used for a prescribed period of time which can be set by one or more time units. An operator or other entity identifies a set of service areas to be tested at an increased effective load. A desired test level (e.g., increased traffic load) is determined, and a corresponding number of radio resource time units is determined to achieve the desired test level conditions. Use of radio communication resources in the determined one or more time units is blocked for a test period. Performance in each service area during the test period is determined, and thereafter, aggregated into overall test network statistics as deemed appropriate.

The performance may be determined based on measures such as: dropped call rate, received signal strength, signal quality, interference, handover success rate, and bit and block error rates. Each time unit may correspond to a time slot or a time frame, and each radio resource may be associated with a frequency, a frequency range, or a frequency hopping group. Alternatively, if the radio communication system uses code division multiple access (CDMA), each radio resource may be associated with the code, and each time unit may correspond to a transmission time interval (TTI). In that case, the radio transmitters in the set of service areas transmit at an increased power level during unblocked TTIs and at a decreased power level during blocked TTIs.

In an example embodiment, synchronous time units in all of the service areas being tested are blocked. Synchronous time units or time slots are preferentially chosen because interference from one service area typically affects performance in other service areas. If the effect of the increased effective load is to be registered equally across the network test area in the form of increased interference, the load must be concentrated to the same time unit(s) in all service areas.

In practice, the blocking of exactly synchronous time units or time slots may not be possible. This could be the case, for example, if different service areas obtain their timing reference from different and independent transmission links. In asynchronous systems, time units or time slots as close to synchronous as possible should be blocked in the different service areas. Any non-alignment can then be corrected for in the effective load calculation. Such a correction is desirable since non-alignment reduces the interference experienced by the traffic in the network, and therefore, the actual effective load achieved during the test.

In one non-limiting, example embodiment applied to a control node, a controller in that node controls plural radio base station units. The radio base station units may correspond to base station sites or to base station sectors. Once a set of service areas is specified for testing, one or more times in each service area is determined when one or more radio resources associated with each such service area will not be used. A performance measure is determined under those conditions. Another non-limiting, example embodiment is a computer program product that includes computer code operable to control a computer. That code may include first logic operable to determine a test set of service areas for testing, second logic operable to determine one or more times in each service area when one or more radio resources for each service area will not be used, and third logic operable to determine each service area's performance under those conditions.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description makes reference to GSM-type radio resources, including time slots and frequency hopping, the invention may be employed in virtually any type of radio communication system in which time is a factor in allocating and using radio resources. In some instances, detailed descriptions of well-known methods, interfaces, circuits, etc., are omitted so as not to obscure the description with unnecessary detail. Moreover, individual blocks are shown in some of the figures. Those skilled in the art will appreciate that the functions of those blocks may be implemented using individual hardware circuits, using software program products in conjunction with a suitably-programmed microprocessor or other computer, using application specific circuitry (ASIC), and/or using one or more digital signal processors (DSPs).

Figure 1:
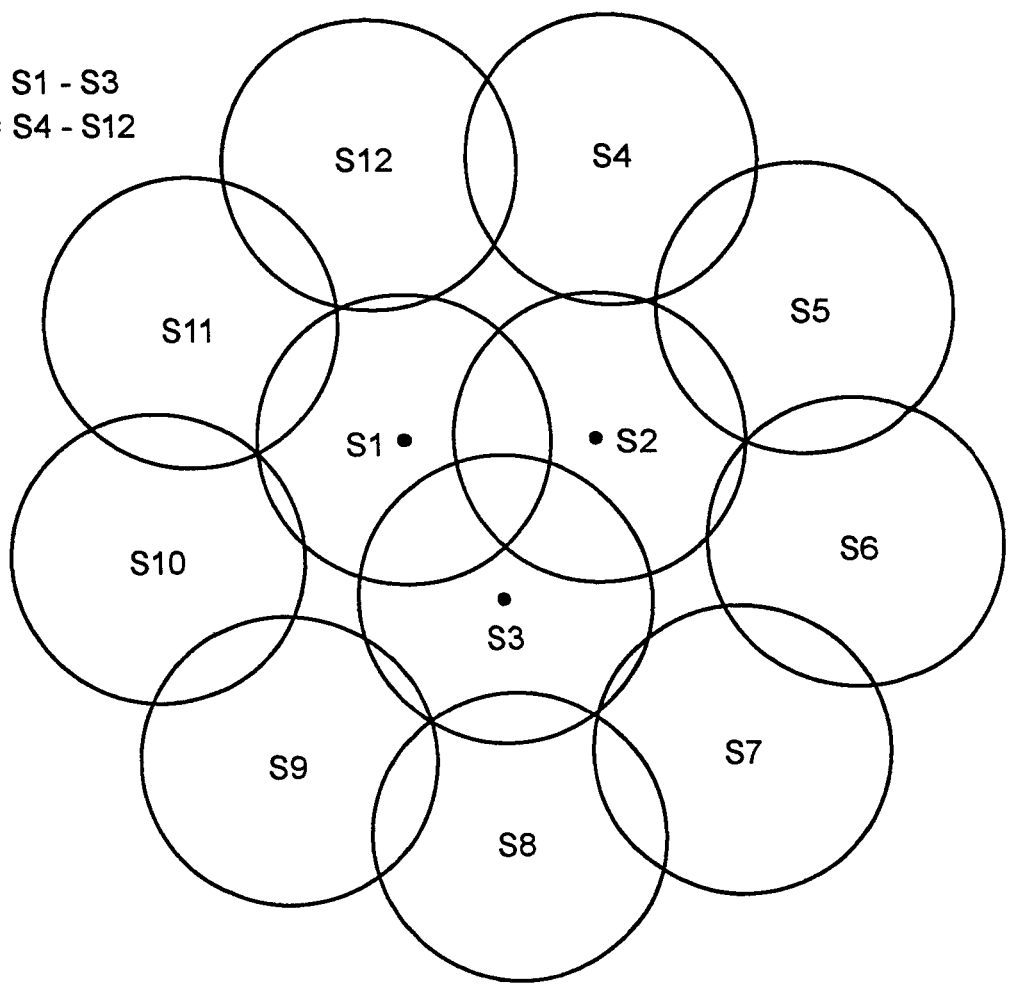
FIG. 1 illustrates a radio communications system that includes a number of service areas, a set of which are to be tested.

FIG. 1 illustrates a radio communication system comprised of multiple service areas, referred to here generically as "sites", including sites S1 through S12. The term "site" encompasses a cell, a radio base station, or a radio base station sector. An effective load/traffic capacity test is desired to be performed on a certain set of service areas. In the example in FIG. 1, sites S1 through S12 are preferably all put under test conditions to determine the performance of sites S1-S3. That is why sites S1-S3 are referred to as first-tier sites, and sites S4-S12 are referred to as second-tier sites. The second-tier sites are tested to include their effects, e.g., interference, etc., on the first-tier sites. For purposes of this example only, the radio communication system is assumed to be a TDMA type system that supports frequency hopping between a number of hopping frequencies, with each frequency being divided into repeating frames of eight time slots TS0-TS7.

Figure 2:
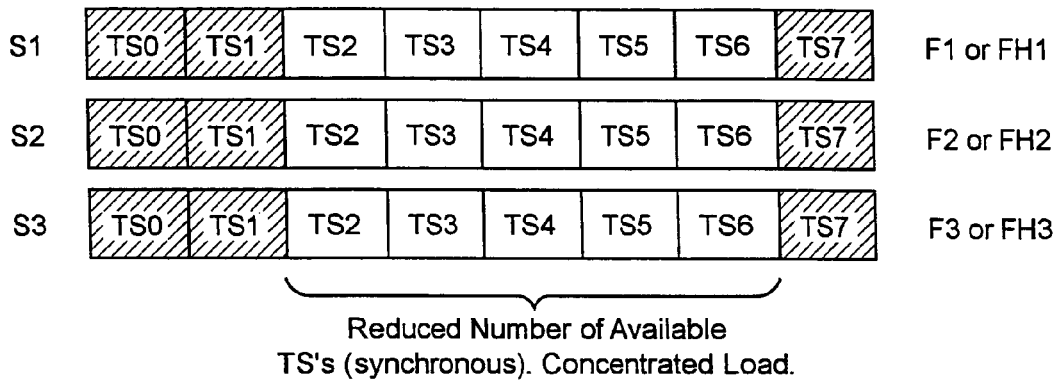
FIG. 2 illustrates time slot resources associated with each of the sites to be tested in a synchronous system.

FIG. 2 illustrates a time slot frame for each of sites S1-S3. In this case, the time slots are synchronized in time so that each time slot on each frequency starts and ends at the same time. In order to increase the frequency load to a predetermined value, communication using time slots TS0, TS1, and TS7 is blocked during a test period for each site S1-S12. The number of blocked time slots depends on the load level to be tested, and preferably, also takes into account the actual load currently being generated by subscribers. The load should be increased so that those subscribers do not detect congestion. Maintaining congestion at acceptable levels can be assured by installing sufficient equipment in the frequency hopping channel group with the reduced number of time slots, or by creating an extra frequency or frequency hopping channel group with enough time slots that can serve users that would otherwise be denied access to the network. As a result of blocking time slots TS0, TS1, and TS7, all of the traffic must be carried using only time slots TS2-TS6. This effectively increases the traffic load at each site S1-S12 and permits performance testing at sites S1-S3 under this increased load condition.

Performance may be determined or measured in any suitable manner including (but not limited to) measuring a number of dropped calls, a dropped call rate, signal quality, signal strength, interference, bit or block error rates, delay, etc. Such performance indicators from each site are then aggregated into an overall network performance measure(s) as deemed appropriate by the operator. For example, a dropped call rate for sites S1-S3 and an average frequency load for sites S1-S12 may be calculated and compared to the operator-defined targets for traffic load and dropped call rate in the network. Furthermore, individual site data can be used to identify problem areas that require particular attention with respect to continued network optimization, site additions, equipment upgrades, and so on, in order for the operator to meet network capacity and performance targets.

Figure 3:
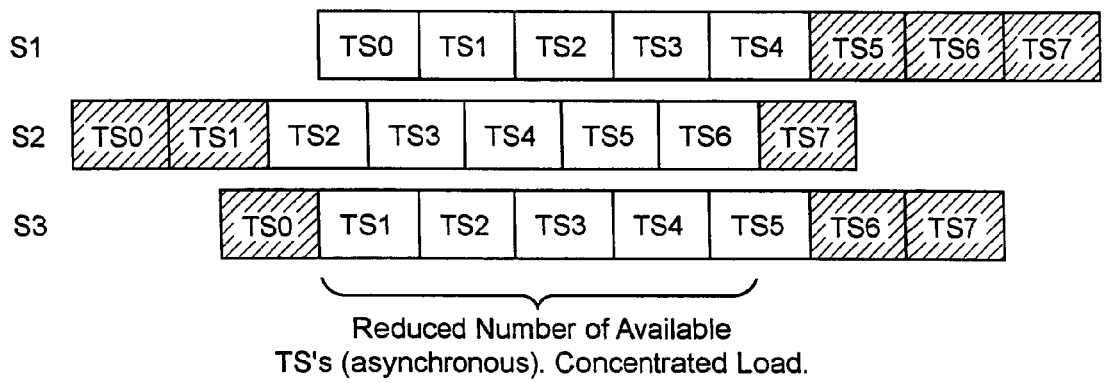
FIG. 3 illustrates time slots of the sites to be tested in an asynchronous system.

Conducting a similar performance test in an unsynchronized system is more complicated. FIG. 3 shows such an unsynchronized system with the time slots for each of the sites S1-S3 being offset from each other. Time slots most closely aligned in each site are the best candidates for blocking. Exemplary time slots for blocking in this case are time slots TS5-TS7 for site S1, time slots TS0, TS1, and TS7 for site S2, and time slots TS0, TS6, and TS7 for site S3, as shown. In this way, the traffic load may be concentrated in five time slots in each of the sites that are as close to synchronous as possible, although they have different time slot numbers in the repeating frame structure of each site. The corresponding time slots in the second tier sites S4-S12 that are closely aligned to the blocked time slots in the first tier sites S1-S3 are also blocked. As with the synchronized case, the number of time slots blocked may be balanced with other factors such as avoiding congestion for active subscribers in the network and maintaining reasonable quality of service, in addition to the primary aim of reaching a target effective load for network testing.

In order to ascertain the relative timing offsets of sites in an unsynchronized system, timing measurements must be performed, typically by using a test mobile station to register timing synchronization information broadcast by each site. This timing information for each site can be compared to determine offsets between the time slots at each of the sites, and thereby, which time slot numbers should be blocked in each site to achieve close to synchronous time slot blocking across the test area as desired.

The frequency load of sites S1-S12 determined in an unsynchronized setting is preferably corrected for the lack of synchronization between time slots in the different sites. Such a correction is desirable since unaligned time slots reduce the interference experienced by traffic in the unblocked time slots, and therefore, the actual effective load achieved during a test period.

One non-limiting, example way in which the measurements in an unsynchronized application may be corrected is now described. The maximum offset between corresponding blocked time slots in an arbitrary site and the chosen reference site is plus or minus one-half a time slot, if the time slots to block have been chosen to minimize their non-alignment. Hence, the maximum offset between any arbitrary site pair in the set is one time slot. A correction can be applied to the calculated frequency load based on a fixed, average timing offset in the site set. For example, it can be shown that the average timing offset between an arbitrary site pair with independent random offsets from the reference site in the range of −0.5 time slots to +0.5 time slots is 0.333 (one-third) time slots. Assume now as an example that two time slots in each site should be blocked in order to achieve the desired frequency load for the network test. The frequency load carried by sites with six unblocked time slots may then be reduced by a factor 0.333/6 when calculating the effective frequency load. This factor corresponds to the relative amount of traffic in the site that, on average, does not contribute to interference in the other sites.

In some cases, in both synchronized and unsynchronized systems, it may be necessary to block fewer than the desired number of time slots in certain sites, for example, in order to prevent congestion if sufficient equipment to cater for the higher effective load has not been able to be installed. No correction is necessary for sites with fewer than the maximum number of blocked time slots. This is because the additional unblocked time slot(s) can always be chosen so as to cover the offset to other sites that is at most one full time slot, as explained above. As a result, there is no interference reduction to the core set of unblocked time slots, i.e., those common to all sites, whose performance is to be evaluated.

By way of illustration, consider the following, non-limiting, frequency-load formulas for a scenario where two time slots have been blocked. In sites with eight unblocked time slots:

$$\text{frequency load (FL)} = \text{Erlang}/(6*8).$$

In sites with seven unblocked time slots:

$$FL = \text{Erlang}/(6*7)$$

In sites with six unblocked time slots:

$$FL = (1-0.333/6)*\text{Erlang}/(6*6)$$

The total frequency load in the set of test sites is as follows:

FL (total)=(Σ FL in all sites in the set)/(number of sites in the set).

Figure 4:
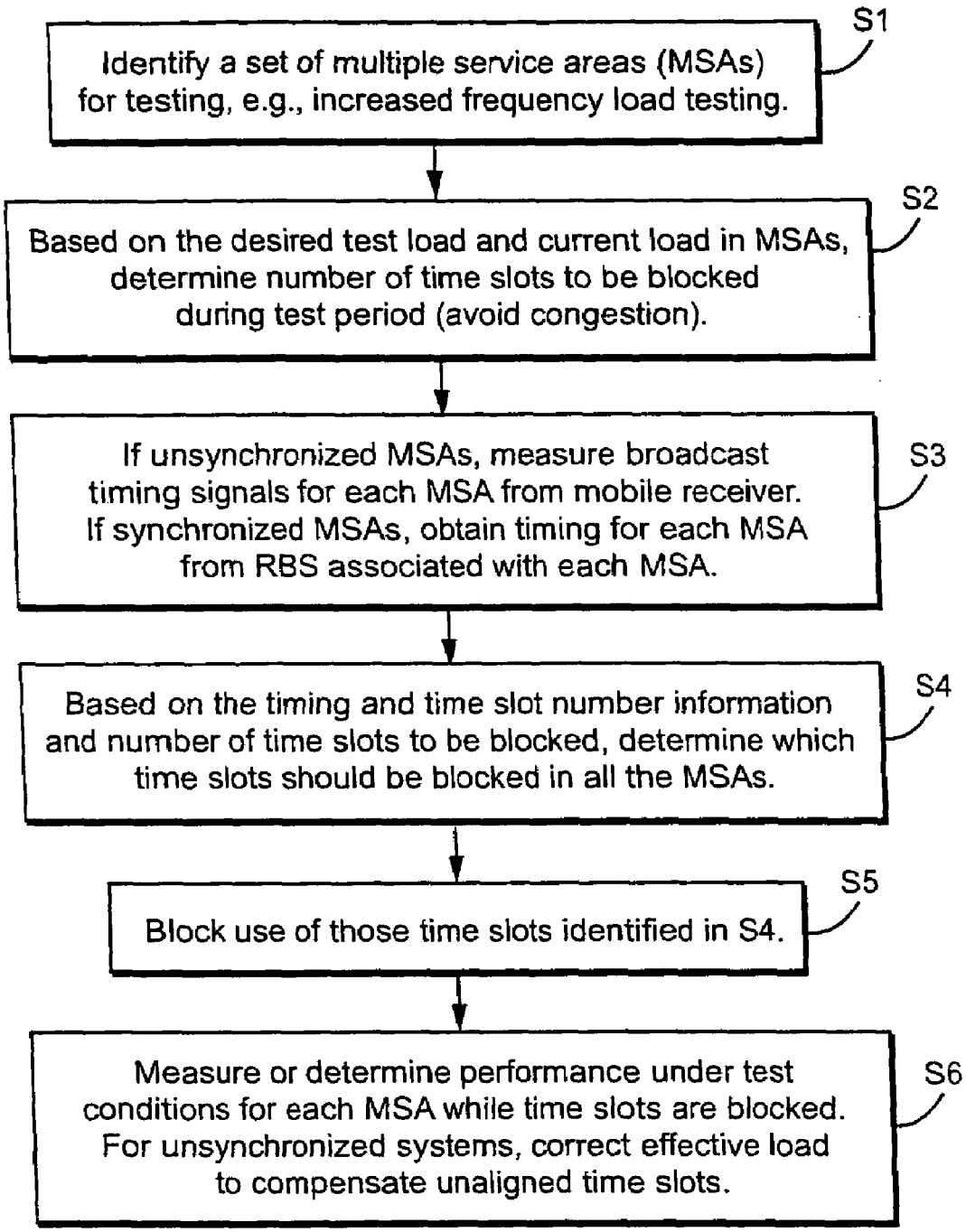
FIG. 4 is a flow chart diagram illustrating a non-limiting set of procedures for measuring the performance of certain sites under increased effective load.

FIG. 4 illustrates an example, non-limiting set of procedures for implementing site testing under increased effective load. A set of multiple service areas (MSAs) is determined for testing (step S1). In the example above, that testing is conducted in the context of increased frequency load. Again, a service area may be a site, a sector, a cell, or any other type of area. Based on the desired test load and the current load in the service areas, the number of time slots in each service area to be blocked during the test period is determined, preferably also ensuring that congestion can be avoided (step S2).

If the service areas are not synchronized, the timing signals broadcast from each service area are measured, for example, by using a roaming mobile "test" receiver. That timing and time slot number information is conveyed to a control node for later use in identifying the time slots to be blocked in the service areas and in correcting the effective load for any time slot non-alignment. If the service areas are synchronized, the control node typically already knows the timing and time slot number information. Otherwise, it can obtain the information directly from the radio base station associated with that service area (step S3).

Based on the timing and time slot number information and the number of time slots to be blocked from step S2, a determination can be made as to which time slots are synchronous and should be blocked in all of the mobile service areas, or in an unsynchronized context, which time slots are the most closely-aligned and should be blocked, using the timing information from an arbitrary service area as a reference (step S4). Those time slots identified in step S4 are blocked (step S5). Performance is then measured or otherwise determined under the increased load condition with certain time slots blocked. For unsynchronized systems, the effective load is corrected to compensate for unaligned time slots (step S6).

Figure 5:
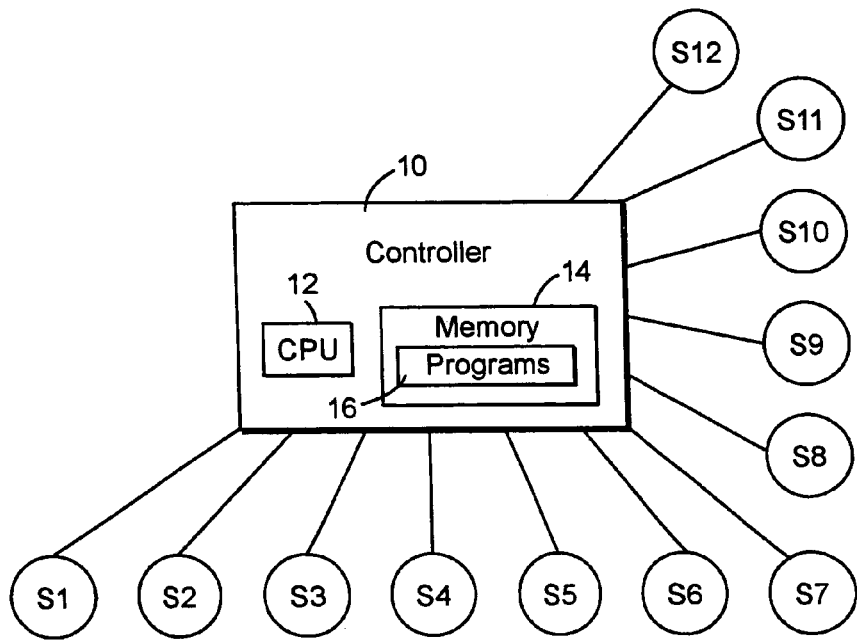
FIG. 5 illustrates a controller for controlling the sites and controlling the test procedures.

FIG. 5 illustrates a controller node 10 that includes a CPU 12 and a memory 14 with a program that stores logic code to implement the steps illustrated, for example, in FIG. 4. Of course, other steps and procedures may be coded to implement the claimed invention. The controller 10 in FIG. 5 is coupled to each of the sites S1-S12, consistent with the sites shown in the two tier structure of FIG. 1, where sites S1-S3 are first-tier sites and sites S4-S12 are second-tier sites. Although each radio resource may also be associated with a frequency, frequency range, or frequency hopping group, such as illustrated in FIGS. 2 and 3 in the context of a TDMA-type system, the radio resource may also correspond, for example, to a spreading code like those used in a code division multiple access system. In a CDMA system, each time unit then corresponds to a transmission time interval (TTI).

Figure 6A:
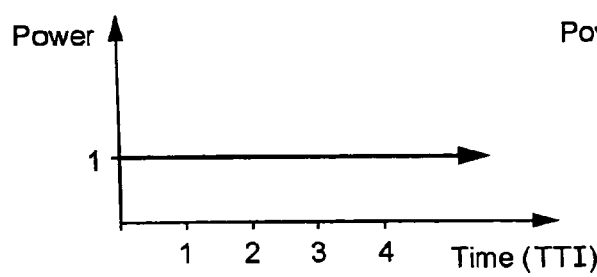
FIGS. 6A and 6B illustrate drawings in which the transmit power in a particular site is concentrated to specific transmission time intervals.
Figure 6B:
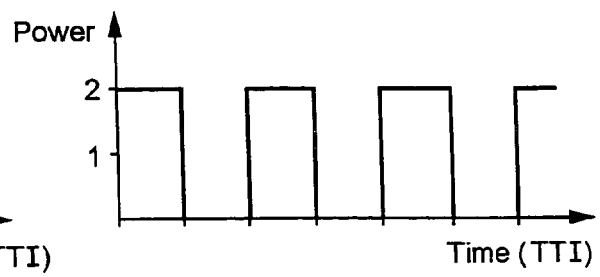

Reference is made to FIGS. 6A and 6B which illustrate the transmission power in a particular site in FIG. 6. FIG. 6A is a graph that shows a normal transmission situation in which the power level (normalized to "1") is consistent over consecutive TTIs. However, to test the capacity of the system, signals may be transmitted in a "compressed mode," an example of which is illustrated in FIG. 6B. The transmitters in each site being tested transmit at twice the power during a first transmission time interval, but at zero power in the following second TTI. This pattern effectively doubles the load in the service area during alternating TTIs, and the performance of the system can be measured during those increased transmit power TTIs. Of course, the power may be increased by something other than twice (either more or less), during the first TTI, and the power during the second TTI may be something more than zero. Also, both the higher and lower power periods may extend for more than one TTI, and they need not extend for an equal number of TTIs. As these figures illustrate, an important radio resource in a CDMA system is transmission power, which is allocated with spreading codes. Here, the time unit being blocked corresponds to alternating TTIs which results in increased traffic load during the other TTIs.

There may be situations in which it is desirable to use the time unit/slot blocking approach in addition to one or more other load increasing strategies. Such other strategies might include (but are not limited to) decreasing a number of frequencies for use, increasing a number of mobile users, turning off discontinuous transmission (DTX), turning off power control, etc. A combination of loading methods may be desirable when the target effective load for testing is far greater than the current load in the test area. Many time slots must then be blocked to achieve the requisite load, which makes congestion harder to avoid in practice since significant additional equipment beyond that required for the current network load must be in place to do so. A combination of loading techniques may then become a more feasible alternative.

The time unit blocking approach to increasing the effective load may be used with other cellular network technologies than those based on TDMA and CDMA, because time is always an important resource. For example, in orthogonal frequency division multiplexing (OFDM) and related access techniques, the time of use for one or more sub-channel frequencies, so-called tones, can be limited in order to increase the effective system load. With the primary radio resources being frequency and time, OFDM systems bear strong similarities in this context to the TDMA based systems like GSM discussed in detail above.

The time unit blocking approach achieves numerous advantages over other techniques. First, the operator can test the network under increased effective load conditions without having to manually add extra users to the network, which saves time and money and gives truly representative performance results. Second, the operator can maintain the true radio resource burden of the users without having to disable features like power control and DTX in order to achieve an increased effective load whose magnitude is then difficult to quantify. Third, the operator can increase the effective system load without changing the radio environment for the users, which would be the case if the frequency bandwidth and/or the number of hopping frequencies were reduced, thereby ensuring representative performance results. Fourth, congestion can be avoided by ensuring that sufficient equipment is installed, by creating an extra channel group containing a full set of time units to support users that would otherwise be denied access to the network, by blocking fewer than the maximum number of time units in certain sites where congestion is otherwise deemed likely, or by some combination of the above. Fifth, the time unit blocking approach can be combined with other techniques for increasing the effective system load if desired. Sixth, the time unit blocking approach works in principle for all cellular network technologies because time is always a key resource. Seventh, the time unit blocking approach is applicable in both synchronous and asynchronous cellular systems. Eighth, the time unit blocking approach is easily implemented and operated in a control node in which the test preparations, the test itself, and the subsequent results analysis, both on a network and local site level, can be performed with minimal impact to normal network operations.

While practical and preferred implementations of example embodiments have been described, it is to be understood that the invention is not limited to any disclosed embodiment or implementation, and on the contrary, is intended to cover various modifications and equivalent arrangements included within the scope of the appended claims.

The invention claimed is:

1. A method for use in a radio communications system including multiple service areas, each service area including a predetermined number of radio communication resources, where each radio communication resource is associated with a time unit, comprising:
   identifying a set of service areas for testing a desired test parameter or level;
   during a test period, concentrating use of radio communication resources by mobile radio stations to a sub-set of available time units in each service area in the set of service areas by blocking use of radio communication resources by any of the mobile radio stations during one or more time units, thereby increasing a demand for available radio communication resources sub-set of available time units in each service area during the period; and
   determining a performance associated with the set of service areas during the test period with the mobile radio stations using just the sub-set of available time units in each service area for communication.

2. The method in claim 1, wherein each radio communication resource is associated with a frequency, a frequency range, or a frequency hopping group.

3. The method in claim 1, wherein each time unit corresponds to a time slot or time frame.

4. The method in claim 1, wherein the test parameter level is traffic load or traffic capacity and the performance includes one or more of: a number of dropped calls, a dropped call rate, signal strength, signal quality, interference, delay, and an error rate.

5. The method in claim 1, wherein the radio communications system uses code division multiple access (CDMA), each radio communication resource is associated with a code, and each time unit corresponds to a transmission time interval (TTI).

6. The method in claim 5, wherein radio transmitters in the set of service areas transmit at an increased power during unblocked TTIs and at decreased power during blocked TTIs.

7. The method in claim 1, wherein the time units in each of the service areas in the set are synchronized.

8. The method in claim 1, wherein the time units in each of the service areas in the set are unsynchronized, the method further comprising:
   determining which of the radio communication resource time units for each of the service areas are most closely aligned,
   wherein the one or more blocked time units includes one or more of the determined radio communication resource time units.

9. The method in claim 8, further comprising:
   compensating the desired test parameter or the determined performance for a lack of synchronization between radio communication resource time units in each of the service areas.

10. The method in claim 1, further comprising:
    using another technique to increase a traffic load on the set of service areas during the test period in addition to blocking one or more radio communication resource time units.

11. The method in claim 1, further comprising:
    determining a number of radio communication resource time units to block that avoids or limits congestion for active subscribers below a predetermined level.

12. A control node for use in a radio communications system including radio base station (RBS) units, each RBS unit associated with a service area and each service area including a predetermined number of radio resources and a predetermined number of time periods when the predetermined number of radio resources may be used for communication by multiple radio stations, comprising electronic circuitry configured to:
    specify a set of service areas for testing;
    determine a first subset of the predetermined number of time periods in each service area in the set when radio resources may be used for radio communication by mobile radio stations;
    determine a second subset of the predetermined number of time periods in each service area in the set when radio resources may not be used for radio communication by any of the by mobile radio stations; and
    determine performance when radio resources are used for radio communication by the mobile radio stations only during the first subset of the predetermined number of time periods in each service area in the set.

13. The control node in claim 12, wherein the control node is an RBS controller.

14. The control node in claim 12, wherein the RBS units correspond to base station sites or to base station sectors.

15. The control node in claim 12, wherein each radio resource is associated with a frequency, a frequency range, or a frequency hopping group.

16. The control node in claim 12, wherein each of the one or more time periods corresponds to a time slot or time frame.

17. The control node in claim 12, wherein the performance is determined based on traffic load or traffic capacity using one or more of: a number of dropped calls,
    dropped call rate, signal strength, signal quality, interference, delay, and an error rate.

18. The control node in claim 12, wherein the radio communications system uses code division multiple access (CDMA), each radio resource is associated with a code, and each time period corresponds to a transmission time interval (TTI).

19. The control node in claim 18, wherein the electronic circuitry is configured to instruct radio transmitters in the set of service areas to transmit at an increased power during unblocked TTIs and at decreased power during blocked TTIs.

20. The control node in claim 12, wherein the time periods in each of the service areas in the set are synchronized.

21. The control node in claim 12, wherein the time periods in each of the service areas in the set are unsynchronized, the electronic circuitry is further configured to:
    determine which of the radio resource time periods for each of the service areas in the set are most closely aligned,
    wherein the second subset of the predetermined number of time periods includes most closely aligned radio resource time periods.

22. The control node in claim 12, wherein the electronic circuitry is further configured to:
 compensate the desired test parameter or the determined performance for a lack of synchronization between times in each of the service areas.

23. The control node in claim 12, wherein the electronic circuitry is further configured to:
 use another technique to increase a load on the set of service areas during performance determination in addition to only using radio resources during the first subset of the predetermined number of time periods in each service area in the set.

24. The control node in claim 12, wherein the electronic circuitry is further configured to:
 determine the second subset of the predetermined number of time periods in each service area in the set so as to avoid or limit congestion for active subscribers below a predetermined level.

25. A computer program product for use in a radio communications system including multiple service areas, each service area including a predetermined number of radio communication resources, where each radio communication resource is associated with a time unit, the computer program product including computer code stored in a tangible storage medium and executable by a computer the computer program product comprising:
 first logic code configured, when executed by the computer, to determine a set of service areas for testing;
 second logic code configured, when executed by the computer, to determine one or more times in each service area in the set when one or more radio resources for each service area may not be used for radio communication by mobile radio stations and one or more times in each service area in the set when radio resources for each service area may be used for radio communication by the mobile radio stations; and
 third logic code configured, when executed by the computer, to determine performance when the one or more times in each service area when one or more radio resources for each service area may not be used for radio communication by the mobile radio stations in order to increase a radio communications load during the one or more times in each service area in the set when the one or more radio resources for each service area may be used for radio communication.

26. The computer program product in claim 25, wherein each radio resource is associated with a frequency, a frequency range, or a frequency hopping group.

27. The computer program product in claim 25, wherein each of the one or more times corresponds to a time slot or time frame.

28. The computer program product in claim 25, wherein the performance is determined based on traffic load or traffic capacity using one or more of: a number of dropped calls, a dropped call rate, signal strength, signal quality, interference, delay, and an error rate.

29. Apparatus for use in a radio communications system including multiple service areas, each service area including a predetermined number of radio communication resources, where each radio communication resource is associated with a time interval for radio communication, comprising:
 means for determining one or more radio communication resource time intervals in each service area in a set of service areas to be blocked for use by any mobile radio station;
 means for blocking use of radio communication resources by any mobile radio station in the determined one or more radio communication resource time intervals for a test period to increase a usage load on remaining radio communication resource time intervals that are not blocked; and
 means for determining a performance parameter associated with the increased usage load of each service area during the test period.

30. The apparatus in claim 29, wherein each radio communication resource is associated with a frequency, a frequency range, or a frequency hopping group.

31. The apparatus in claim 29, wherein the radio communications system uses code division multiple access (CDMA), each radio communication resource is associated with a code, and each time interval corresponds to a transmission time interval (TTI).

32. The apparatus in claim 29, wherein the time intervals in each of the service areas in the set are synchronized.

33. The apparatus in claim 29, wherein the time intervals in each of the service areas in the set are unsynchronized, the apparatus further comprising:
 means for determining which of the radio communication resource time intervals for each of the service areas are most closely aligned,
 wherein the one or more blocked time intervals includes one or more of the determined radio communication resource time intervals.

34. The apparatus in claim 29, further comprising:
 means for compensating the desired test parameter or the determined performance for a lack of synchronization between radio communication resource time intervals in each of the service areas.

\* \* \* \* \*